（12）United States Patent
Li et al.

(10) Patent No.: US 8,405,358 B2
(45) Date of Patent: Mar. 26, 2013

(54) BATTERY CHARGING SYSTEMS WITH CONTROLLABLE CHARGING CURRENTS

(75) Inventors: Guoxing Li, Sunnyvale, CA (US); Ruichao Tang, Shenzhen (CN); Chutao Zhang, Shenzhen (CN)

(73) Assignee: O2Micro Inc., Santa Clara, CA (US)

( * ) Notice: Subject to any disclaimer, the term of this patent is extended or adjusted under 35 U.S.C. 154(b) by 774 days.

(21) Appl. No.: 12/547,761

(22) Filed: Aug. 26, 2009

(65) Prior Publication Data

US 2010/0052624 A1 Mar. 4, 2010

Related U.S. Application Data

(60) Provisional application No. 61/190,767, filed on Sep. 2, 2008.

(51) Int. Cl.
*H02J 7/00* (2006.01)
*H02J 7/04* (2006.01)
*H02J 7/16* (2006.01)

(52) U.S. Cl. ........ 320/134; 320/128; 320/132; 320/152; 320/157; 320/162

(58) Field of Classification Search .................... 320/134
See application file for complete search history.

(56) References Cited

U.S. PATENT DOCUMENTS 7,180,268 B2    2/2007   Denning et al.

FOREIGN PATENT DOCUMENTS

| CN | 1674402 A | | 9/2005 |
| CN | 101222075 A | | 7/2008 |
| JP | 11164489 A | | 6/1999 |
| JP | 19970325732 | * | 6/1999 |
| WO | 9838720 A1 | | 9/1998 |

* cited by examiner

*Primary Examiner* — Edward Tso
*Assistant Examiner* — Ahmed Omar

(57) ABSTRACT

A charging path includes a charging switch for transferring a charging current from an input terminal to an output terminal. The charging path further includes a first enable terminal coupled to the charging switch. The first enable terminal receives a first enable signal to control the charging switch to operate in either a first mode, a second mode, or a third mode, based on a status of the output terminal. More specifically, in the first mode, the charging switch is fully turned off. In the second mode, an equivalent resistance of the charging switch is determined by a control terminal of the charging switch. In the third mode, the charging switch is turned off.

18 Claims, 8 Drawing Sheets

US 8,405,358 B2

BATTERY CHARGING SYSTEMS WITH CONTROLLABLE CHARGING CURRENTS

RELATED APPLICATION

This application claims priority to U.S. Provisional Application No. 61/190,767, filed on Sep. 2, 2008, by G. Li et al., entitled "Battery Charging Systems with Controllable Charging Current," which is hereby incorporated by reference in its entirety.

BACKGROUND

FIG. 1 illustrates a circuit diagram of a conventional battery charging system 100. The battery charging system 100 includes a normal current charging path 102 for transferring a normal charging current $I_{normal}$ from a power supply terminal 106 to charge a battery pack 108 when the battery pack 108 is in the normal state. The battery charging system 100 also includes a small current charging path 112 for transferring a relatively small current $I_{small}$ when the battery pack 108 is in the zero-volt (ultra low volt, under voltage protection) state.

When the charging system 100 starts to operate, the small current charging path 112 is enabled by a control signal 114, and the normal current charging path 102 is disabled by a control signal 104. As such, the small current $I_{small}$ flows through the charging path 112 to charge the battery pack 108. Additionally, the charging system 100 receives a feedback signal 110 indicative of a battery voltage $V_{bat}$ of the battery pack 108. If the battery voltage $V_{bat}$ is less than a voltage threshold $V_{th}$ of the normal charging process (including the pre-charging process and the quick-charging process), the battery pack 108 is in the zero-volt state and is charged by the small current $I_{small}$. If the battery voltage $V_{bat}$ is greater than the threshold voltage $V_{th}$, the small current charging path 112 is disabled, and the normal current charging path 102 is enabled. Thus, the battery pack 108 is charged by the normal charging current $I_{normal}$, and the charging system 100 enters the normal charging process.

Usually, the small current charging path 112 includes a power resistor 118 coupled in series with a charging switch 116, to limit the charging current to a relative small current $I_{small}$. The power dissipation on the small current charging path 112 may be relatively high, which increases the system power consumption. In addition, the size of the printed circuit board (PCB) for the battery charging system 100 may be relatively large, increasing the cost of the charging system 100.

SUMMARY

In one embodiment, a charging path includes a charging switch for transferring a charging current from an input terminal to an output terminal. The charging path further includes a first enable terminal coupled to the charging switch. The first enable terminal receives a first enable signal to control the charging switch to operate in either a first mode, a second mode, or a third mode, based on a status of the output terminal. More specifically, in the first mode, the charging switch is fully turned off. In the second mode, an equivalent resistance of the charging switch is determined by a control terminal of the charging switch. In the third mode, the charging switch is turned off.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a system for charging a battery pack. The battery charging system includes a charging path that transfers a charging current to charge the battery pack. The charging path is controlled to operate in different modes, e.g., have different conductance levels. For example, in a first mode, the charging path is fully turned on to transfer a normal charging current. In a second mode, an equivalent resistance of the charging path is controlled to limit the charging current to a relatively small current. In a third mode, the charging path is disabled. Such a battery charging system may need only one charging path by controlling the charging current flowing through the single charging path. As such, the power consumption of the battery charging system can be reduced, and the size of printed circuit board (PCB) and the cost of the battery charging system can also be reduced.

Figure 2A:
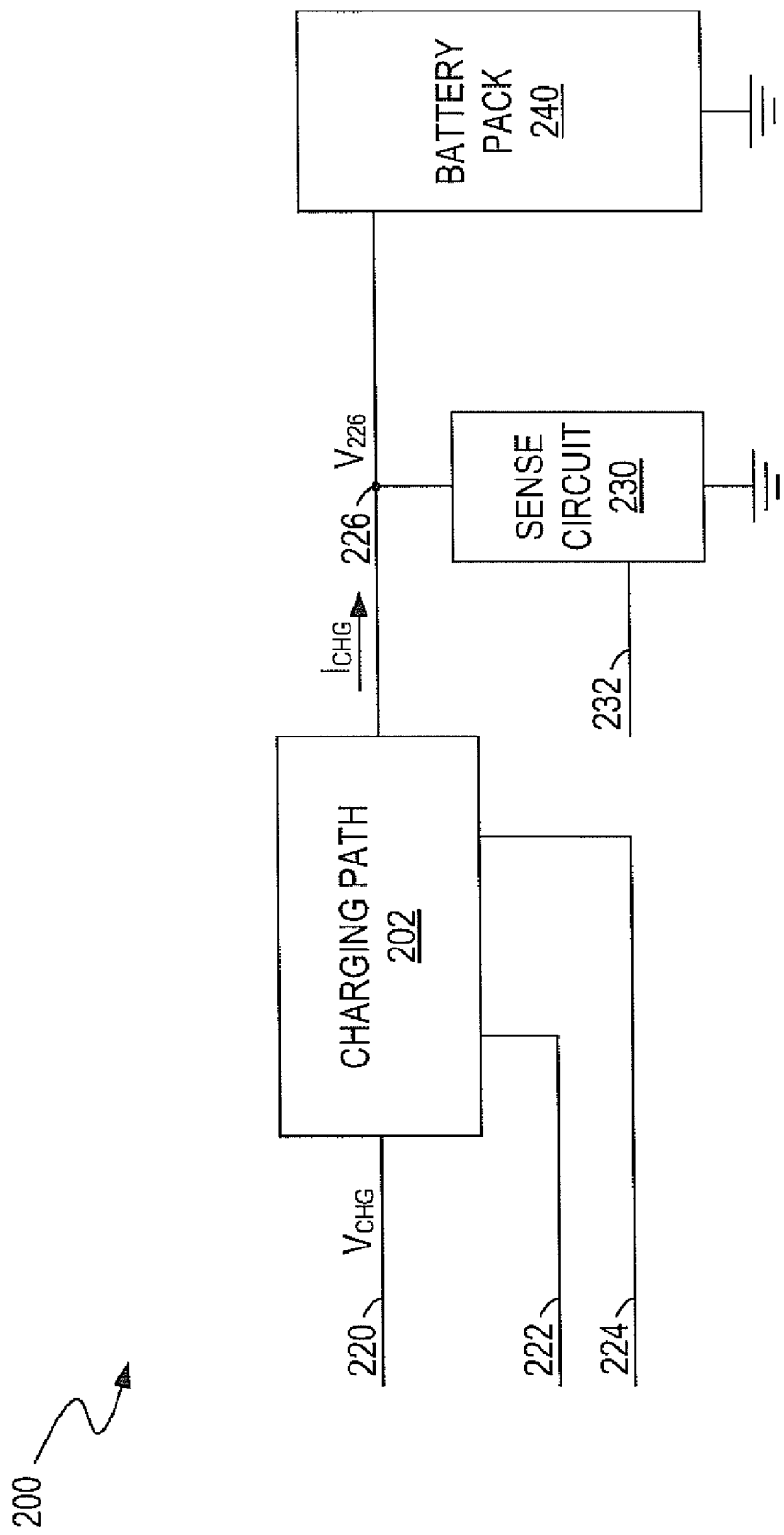
FIG. 2A illustrates a block diagram of an example of a battery charging system, in accordance with one embodiment of the present invention.

FIG. 2A illustrates a block diagram of an example of a battery charging system 200, in accordance with one embodiment of the present invention. The battery charging system 200 includes a charging path 202, a sense circuit 230, and a battery pack 240. The charging path 202 transfers a charging current $I_{chg}$ from a power supply terminal 220, to power the battery pack 240 via a monitoring terminal 226. One or more enable/control signals, e.g., a first enable signal 224 and a second enable signal 222, can control the conductance of the charging path 202, so as to control the charging current $I_{chg}$. For example, the enable signals 222 and 224 can fully turn on the charging path 202, such that the charging current $I_{chg}$ is equal to a normal charging current $I_1$. The enable signals 222 and 224 can also control the charging path 202 to have a relatively high resistance, so as to limit the charging current $I_{chg}$ to a relatively small current $I_2$ ($I_2<I_1$). Furthermore, the enable signals 222 and 224 can also disable the charging path 202.

In one embodiment, the battery pack 240 has three states including a zero-volt (ultra low volt, under voltage protection) state, a normal state, and a full charge state. More specifically, when the voltage $V_{bat}$ of the battery pack 240 is less than a first predetermined threshold $V_1$, e.g., a threshold of a pre-charging process, the battery pack 240 is under protection and the discharging function of the battery pack 240 is disabled by a protection control signal in the battery pack 240. Thus, no voltage on the battery pack 240 can be detected; that is, the battery pack 240 is in the zero-volt (ultra low volt, under voltage protection) state.

When the battery voltage $V_{bat}$ is greater than the first predetermined threshold $V_1$ and less than a second predetermined threshold $V_3$, the battery pack 240 is in the normal state. The second predetermined threshold $V_3$ can be a fully charged voltage of the battery pack 240. The battery charging process in the normal state includes the pre-charging process and a quick-charging process (e.g., constant-voltage charging process, constant-current charging process). If the battery voltage $V_{bat}$ is less than a quick-charge threshold $V_2$, e.g., a threshold of the quick-charging process ($V_1<V_2$), the battery charging system 200 performs the pre-charging process. If the battery voltage $V_{bat}$ is greater than the quick-charge threshold $V_2$, the battery charging system 200 performs the quick-charging process.

Furthermore, when the battery voltage $V_{bat}$ is equal to or greater than the second predetermined threshold $V_3$ ($V_1<V_2<V_3$), the battery pack 240 is considered to be fully charged, or in the full charge state.

In one embodiment, the sense circuit 230 is coupled to the battery pack 240 via the monitoring terminal 226. The sense circuit 230 generates a feedback signal 232 indicative of the voltage $V_{226}$ at the monitoring terminal 226. The battery charging system 200 monitors the state of the battery pack 240 according to the feedback signal 232, and charges the battery pack 240 according to the battery state (e.g., the zero-volt state, the normal state, or the full charge state). In one embodiment, the sense circuit 230 is capable of sensing a battery status such as a battery pack voltage, a cell voltage, a battery current, a cell temperature, and a cell capacity of the battery pack 240, and generating a feedback signal accordingly.

When the battery charging system 200 starts to operate, the enable signals 222 and 224 alternately enable and disable the charging path 202. As such, the monitoring terminal 226 is alternately coupled to and decoupled from the power supply terminal 220. In one embodiment, the power supply terminal 220 is coupled to a power source (not shown in FIG. 2A), e.g., a DC/DC converter, that has a charging voltage $V_{chg}$. If the feedback signal 232 indicates that the monitoring terminal 226 is floating, e.g., no voltage at the monitoring terminal 226 is detected, when the charging path 202 is disabled, and the voltage $V_{226}$ is equal to or greater than the second predetermined threshold $V_3$, e.g., approximately equal to the charging voltage $V_{chg}$, when the charging path 202 is enabled, then the battery pack 240 is not available (e.g., is not connected to the monitoring terminal 226).

If the voltage $V_{226}$ is greater than the first predetermined threshold $V_1$ and less than the second predetermined threshold $V_3$ whether the charging path 202 is enabled or disabled, then the battery pack 240 is available (e.g., is connected to the monitoring terminal 226) and is in the normal state. In the normal state, the enable signals 222 and 224 fully turn on the charging path 202, and the battery pack 240 is charged by the normal charging current $I_1$. The current level $I_1$ can be adjusted by a charging management controller (not shown in FIG. 2A) according to the status (e.g., battery pack voltage, cell voltage, battery current, cell temperature, and cell capacity) of the battery pack 240.

If the voltage $V_{226}$ is equal to or greater than the second predetermined threshold $V_3$ when the charging path 202 is disabled, then the battery pack 240 is available and is in the full charge state. The enable signals 222 and 224 can disable the charging path 202, and the battery charging process will be terminated.

Furthermore, if no voltage at the monitoring terminal 226 is detected, e.g., the voltage $V_{226}$ is zero, when the charging path 202 is disabled, and the voltage $V_{226}$ is greater than zero and less than the first predetermined threshold $V_1$ when the charging path 202 is enabled, then the battery pack 240 is available and is in the zero-volt state. Specifically, in the zero-volt state, the discharging function of the battery pack 240 is disabled. As such, when the charging path 202 is disabled, no voltage is detected on the battery pack 240. When the charging path 202 is enabled, the battery pack 240 is charged by the charging voltage $V_{chg}$, therefore the voltage $V_{226}$ is dragged down to the battery voltage $V_{bat}$ that is greater than zero and less than the threshold $V_1$. In the zero-volt state, the enable signals 222 and 224 control the charging path 202 so that it has a relatively high resistance, so as to limit the charging current $I_{chg}$ for charging the battery pack 240. Since the charging path 202 is not always on during the battery detecting process, e.g., when detecting whether a battery pack is available and what the status of the battery pack is, the power consumption of the battery charging system 200 is reduced.

Figure 2B:
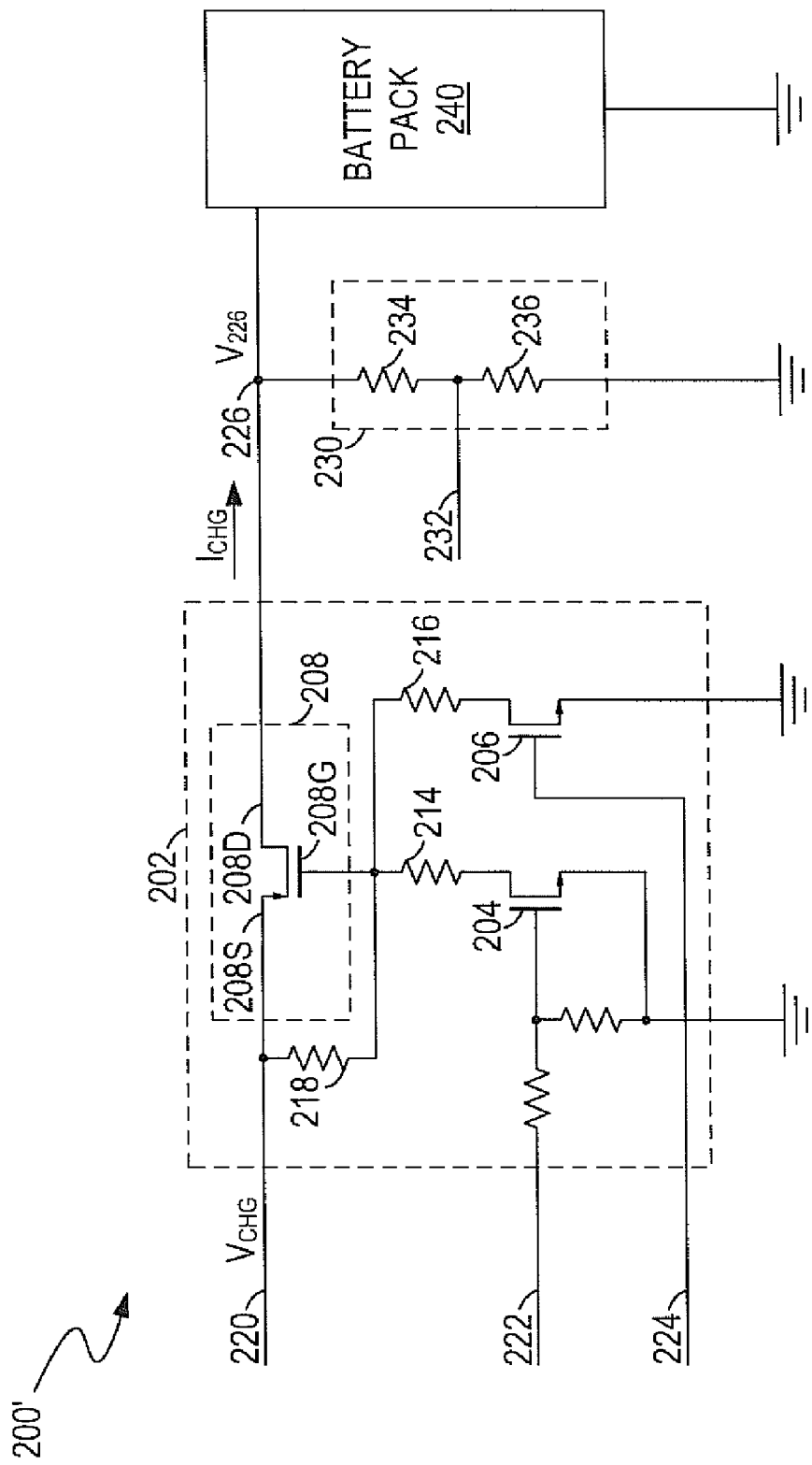
FIG. 2B illustrates an example of a circuit diagram for battery charging system, in accordance with one embodiment of the present invention.

FIG. 2B illustrates an example of a circuit diagram for a battery charging system 200', in accordance with one embodiment of the present invention. Elements that are labeled the same as in FIG. 2A have similar functions. As shown in FIG. 2B, the charging path 202 includes a charging switch 208 for transferring the charging current $I_{chg}$ from the input terminal, e.g., the power supply terminal 220, to an output terminal, e.g., the monitoring terminal 226. The charging switch 208 can be, but is not limit to, a metal-oxide-semiconductor field-effect transistor (MOSFET).

The charging path 202 also includes a resistor divider network. The resistor divider network includes a first resistor 218 coupled between the input terminal 220 and a control terminal, e.g., a gate terminal 208G of the MOSFET switch 208. The resistor divider network further includes a second resistor 216 coupled between the control terminal 208G and ground via a first switch 206 (e.g., an n-channel MOSFET), and a third resistor 214 coupled between the control terminal 208G and ground via a second switch 204 (e.g., an n-channel MOSFET).

A first enable terminal, e.g., a gate terminal of the first switch 206, receives the first enable signal 224. A second enable terminal, e.g., a gate terminal of the second switch 204, receives the second enable signal 222. By respectively controlling the first switch 206 and the second switch 204, the first enable signal 224 and the second enable signal 222 control the charging switch 208 to operate in either a first mode, a second mode, or a third mode, based on a status, e.g., a voltage $V_{226}$, of the output terminal 226. Specifically, in the first mode, the charging switch 208 is fully turned on. In the second mode, an equivalent resistance of the charging switch 208 is determined by a control terminal of the charging switch 208, e.g., the gate terminal 208G of the MOSFET 208. In the third mode, the charging switch 208 is turned off.

In the example of FIG. 2B, the switch 208 is a p-channel MOSFET that has a source 208S coupled to the input terminal 220, a drain 208D coupled to the output terminal 226, and a gate 208G coupled to the source 208S via the first resistor 218. When the second switch 204 is turned on by the second enable signal 222, and the first switch 206 is turned off by the first enable signal 224, the gate-source voltage $V_{gs}$ of the charging switch 208 is given by:

$$V_{gs} = -V_{chg} * R_{218}/(R_{218} + R_{214}), \quad (1)$$

where $R_{218}$ represents the resistance of the first resistor 218, and $R_{214}$ represents the resistance of the third resistor 214. The resistances $R_{218}$ and $R_{214}$ can be selected such that the value of $V_{chg} * R_{218}/(R_{218}+R_{214})$ is greater than a fully turned on voltage of the charging switch 208. Thus, the charging switch 208 operates in the first mode, e.g., is fully turned on, when the second switch 204 is turned on and the first switch 206 is turned off. In addition, when both of the switches 204 and 206 are turned on, the charging switch 208 is also fully turned on.

Similarly, when the second switch 204 is turned off and the first switch 206 is turned on, the gate-source voltage $V_{gs}$ of the charging switch 208 is given by:

$$V_{gs} = -V_{chg} * R_{218}/(R_{218} + R_{216}), \quad (2)$$

where $R_{216}$ represents the resistance of the second resistor 216. The resistances $R_{218}$ and $R_{216}$ can be selected such that the charging switch 208 operates in the linear (ohmic) region and has a relatively high resistance. In the linear (ohmic) region, the equivalent resistance of the charging switch 208 increases as the absolute value $|V_{gs}|$ of the gate-source voltage $V_{gs}$ decreases, and decreases as the absolute value $|V_{gs}|$ increases. In other words, the charging switch 208 operates in the second mode, and the equivalent resistance of the charging switch 208 is determined by the gate-source voltage $V_{gs}$ of the charging switch 208. Advantageously, when the charging switch 208 operates in the linear region, the charging switch 208 can be used as a power resistor, e.g., having a relatively high resistance, to limit the charging current $I_{chg}$ to a relatively small current (e.g., $I_2$). Furthermore, when both of the switches 204 and 206 are turned off, the charging switch 208 operates in the third mode, e.g., is turned off.

Figure 1:
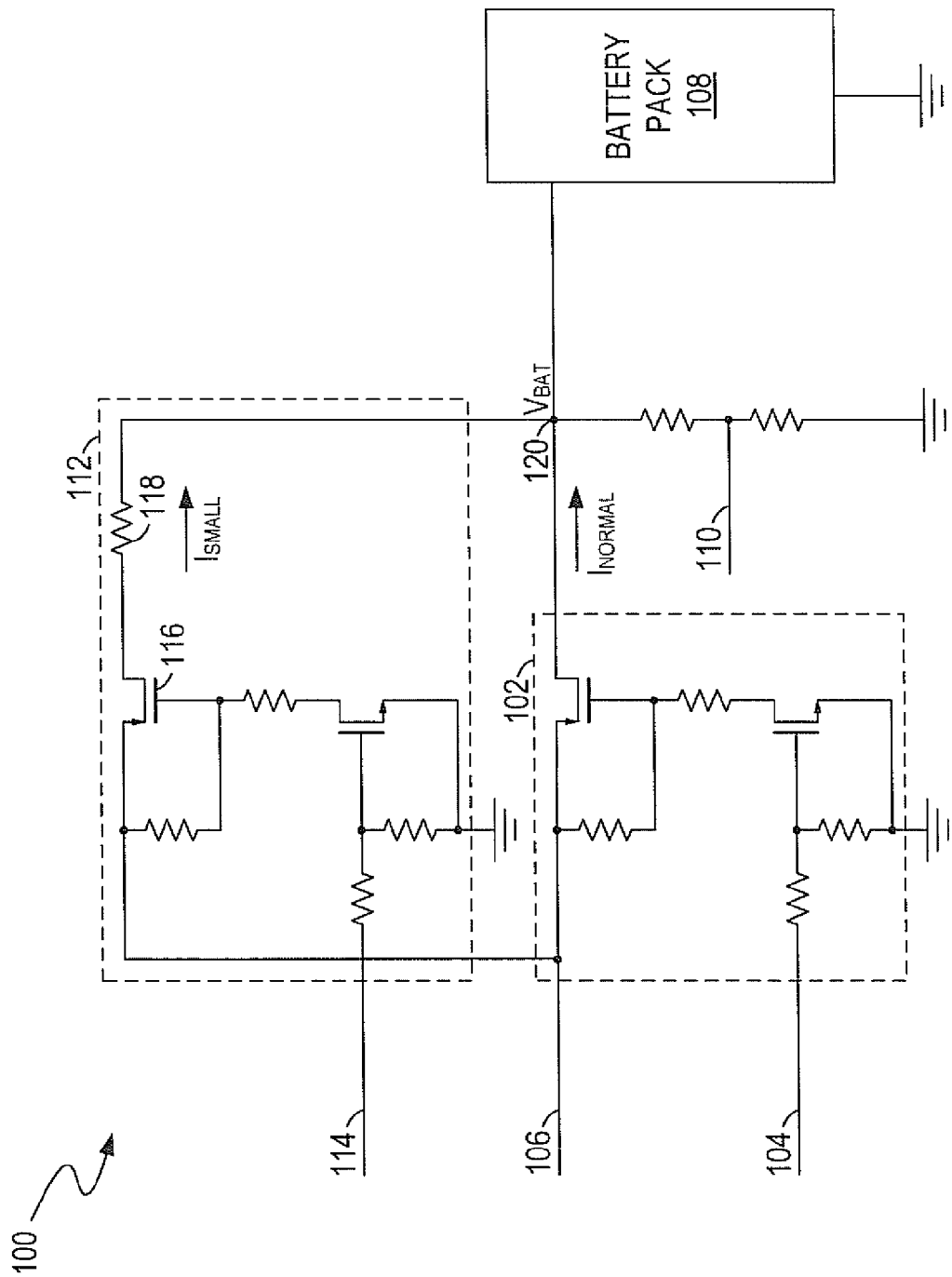
FIG. 1 illustrates a circuit diagram of a battery charging system, in accordance with the prior art.

Consequently, the conventional small current charging path 112 (in FIG. 1) can be omitted. Thus, the power consumption of the battery charging system 200' is reduced. Furthermore, the PCB size and the cost of the battery charging system 200' can be reduced.

In the example of FIG. 2B, the sense circuit 230 includes a resistor 234 coupled to the output terminal 226, and a resistor 236 coupled between the resistor 234 and ground. The feedback signal 232 can be a voltage $V_{232}$ given by:

$$V_{232} = V_{226} * R_{236}/(R_{234} + R_{236}), \quad (3)$$

where $R_{234}$ represents the resistance of the resistor 234, and $R_{236}$ represents the resistance of the resistor 236.

In operation, the status of the output terminal 226 or the state of the battery pack 240 is detected by alternately turning on and off the charging switch 208. In addition, when the status of the output terminal 226 or the state of the battery pack 240 is being detected, the charging switch 208 operates in the second mode. More specifically, when the battery charging system 200' starts to operate, the second enable signal 222 is logically low to turn off the switch 204. The first enable signal 224 can be a pulse signal to alternately turn the switch 206 on and off. Therefore, the charging path 202 transfers a pulse current $I_{chg}$ at the current level $I_2$ to charge the battery pack 240 if the battery pack 240 is available (e.g., is connected to the output terminal 226). The status of the output terminal 226 includes a first voltage $V_{226\_1}$ at the output terminal 226 when the charging switch 208 is turned on and a second voltage $V_{226\_2}$ at the output terminal 226 when the charging switch 208 is turned off. As mentioned in relation to FIG. 2A, the state (e.g., the zero-volt state, the normal state, or the full charge state) of battery pack 240 is detected based on the first voltage $V_{226\_1}$ and the second voltage $V_{226\_2}$.

For example, if the first voltage $V_{226\_1}$ and the second voltage $V_{226\_2}$ are less than the first predetermined threshold $V_1$, the battery pack 240 is in the zero-volt state. In the zero-volt state, the charging switch 208 operates in the second mode, and the charging switch 208 operates as a power resistor that limits a level of the charging current $I_{chg}$ to a relatively low level $I_2$. In one embodiment, the battery pack 240 is charged by the pulse current $I_{chg}$ at the level $I_2$. The equivalent current level of the pulse current $I_{chg}$ is adjusted by adjusting the duty cycle of the pulse signal 224. For example, when the battery voltage $V_{bat}$ increases, the equivalent current level is increased by increasing the duty cycle of the signal 224. In another embodiment, the first enable signal 224 is constantly logically high to keep the switch 206 on, such that the battery pack 240 is charged by a constant charging current $I_{chg}$ at the level $I_2$.

If the first voltage $V_{226\_1}$ or the second voltage $V_{226\_2}$ is greater than the predetermined threshold $V_1$ and less than the second predetermined threshold $V_3$, the battery pack 240 is in the normal state. In the normal state, the charging switch 208 operates in the first mode, e.g., is fully turned on. For example, the second enable signal 222 is constantly logically high to keep the switch 204 on. The battery pack 240 is charged by the constant charging current $I_1$. In the normal state, the first enable signal 224 can be logically high or logic low. In another embodiment, the second enable signal 222 is a pulse signal, e.g., when the battery charging system 200' operates in the pre-charging process. The battery pack 240 is charged by a pulse current $I_{chg}$ at the current level $I_1$. The equivalent current level of the charging current $I_{chg}$ is adjusted by adjusting the duty cycle of the pulse signal 222.

If the second voltage $V_{226\_2}$ is not less than the second predetermined threshold $V_3$, the battery pack 240 is in the full charge state. In the full charge state, the charging switch 208 operates in the third mode, e.g., is turned off. For example, the enable signals 222 and 224 both are logically low to disable the charging path 202.

Furthermore, if the second voltage $V_{226\_2}$ is less than the first predetermined threshold $V_1$, e.g., equal to zero, and the first voltage $V_{226\_1}$ is equal to or greater than the second predetermined threshold $V_3$, e.g., equal to the charging voltage $V_{CHG}$, the battery pack 240 is not available.

Figure 3:
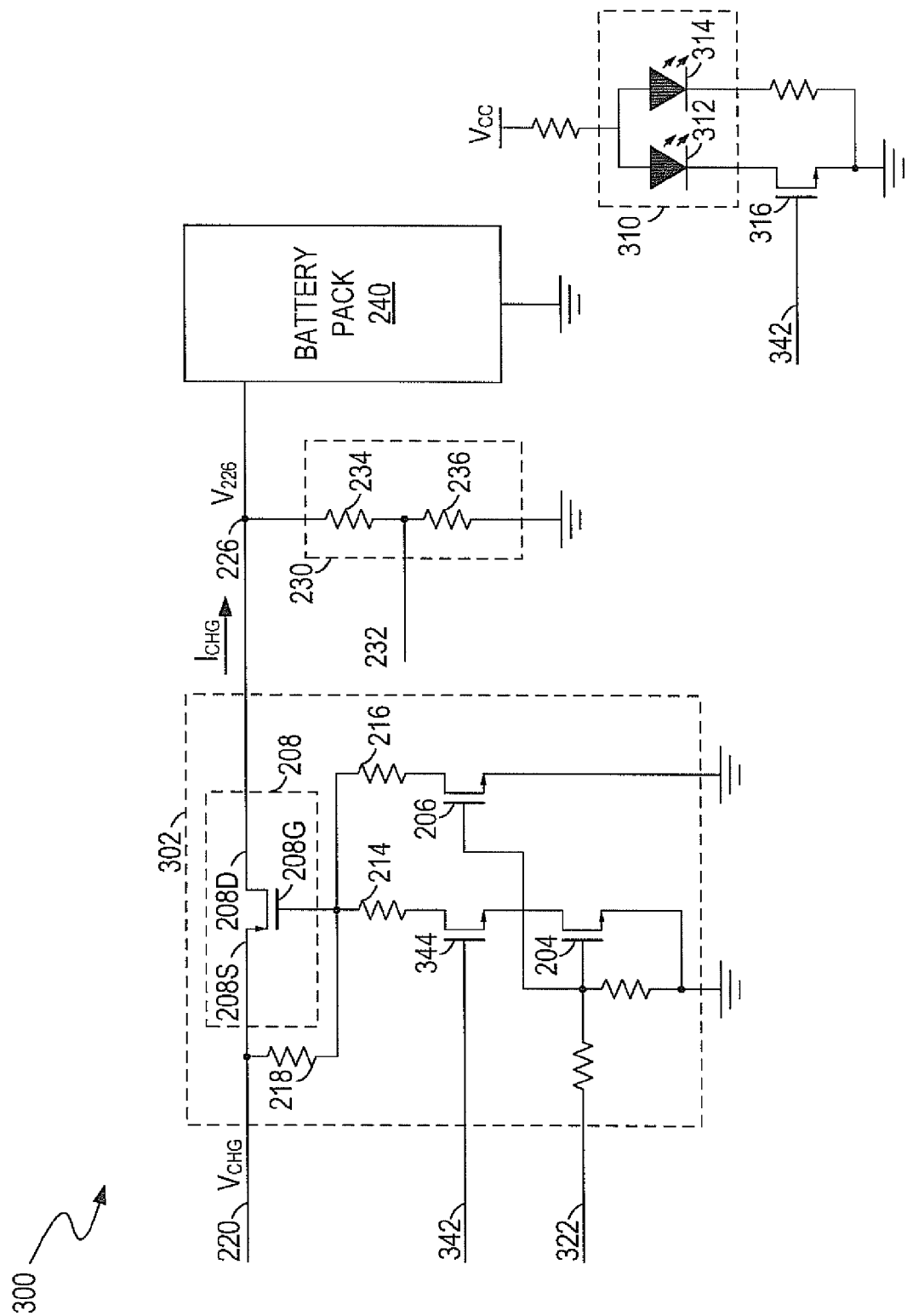
FIG. 3 illustrates an example of a circuit diagram for a battery charging system with utilization of light-emitting diodes (LEDs), in accordance with one embodiment of the present invention.

FIG. 3 illustrates an example of a circuit diagram for a battery charging system 300 with utilization of light-emitting diodes (LEDs) 312 and 314, in accordance with one embodiment of the present invention. Elements that are labeled the same as in FIG. 2A and FIG. 2B have similar functions. The battery charging system 300 includes a charging path 302 that is controlled by a first control signal 322 and a second control signal 342. The battery charging system 300 also includes a light source 310, e.g., one or more LEDs, which is controlled by the second control signal 342.

In one embodiment, the light source 310 includes an LED 314 coupled between a power source $V_{CC}$ and ground, and for emitting a color (e.g., green). The power source $V_{CC}$ can be the power source of the battery charging system 300, such that the LED 314 indicates whether the system 300 is powered on. Furthermore, the light source 310 includes an LED 312 coupled between the power source $V_{CC}$ and ground via a fourth switch 316 (e.g., an n-channel MOSFET), and for emitting a different color (e.g., red). The second control signal 342 controls the fourth switch 316 so as to control the LED 312. Advantageously, the second control signal 342 is adjusted according to the state of the battery back 240, such that the LED 312 can be used to indicate the state of the battery pack 240.

As shown in FIG. 3, the charging path 302 includes the first switch 206 and the second switch 204. The charging path 302 further includes a third switch 344 coupled between the third resistor 214 and the second switch 204. The third switch 344 and the fourth switch 316 are controlled by the same second control signal 342. In addition, the first switch 206 and the second switch 204 are controlled by the same first control signal 322. When the control signals 342 and 322 are both logically low, the switches 344, 204 and 206 are turned off, such that the charging switch 208 is turned off. When the signal 342 is logically high and the signal 322 is logically low, the switch 344 is turned on and the switches 204 and 206 are turned off, such that charging switch 208 is also turned off. When the signal 342 is logically low and the signal 322 is logically high, the switch 344 is turned off and the switches 204 and 206 are turned on, such that the charging switch 208 has a relatively high resistance. When the signals 342 and 322 are logically high, the switches 344, 204 and 206 are turned on, such that the charging switch 208 is fully turned on.

In one such embodiment, since the second control signal 342 that controls the light source 310 is also used to control the charging path 302, the charging path 302 shares the same pin with the light source 310 to receive the control signal 342.

Figure 4:
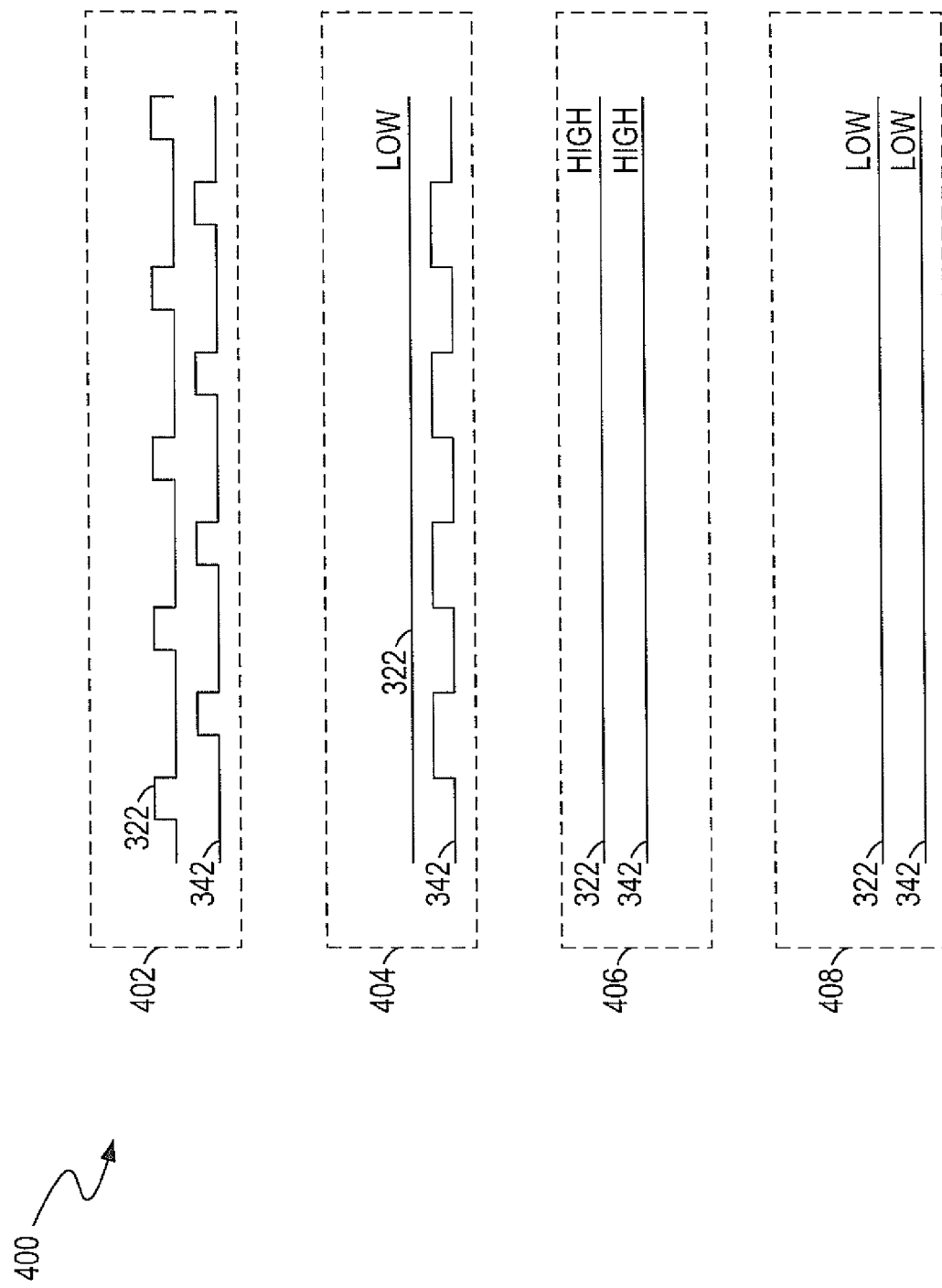
FIG. 4 illustrates an example of a plot for the first control signal and the second control signal in FIG. 3, in accordance with one embodiment of the present invention.

FIG. 4 illustrates an example of a plot 400 for the first control signal 322 and the second control signal 342 in different states of the battery pack 240, in accordance with one embodiment of the present invention. FIG. 4 is described in combination with FIG. 3.

The plot 400 includes blocks 402, 404, 406 and 408. The block 402 shows the waveforms for the control signals 322 and 342 when the battery pack 240 is in the zero-volt state. In block 402, both of the control signals 322 and 342 are pulse signals and have the same period $T_1$ (e.g., four seconds). The duty cycles of the pulse signals 322 and 342 are set properly, such that there is no overlap between the pulse signals 322 and 342. Thus, the path of the switches 344 and 204 is kept off. In addition, the switch 206 is turned on periodically by the pulse signal 322, such that the battery pack 240 is charged by the pulse charging current $I_{chg}$ at the current level $I_2$. At the same time, the LED 312 generates a flashing light (e.g., a red flashing light) having a frequency $1/T_1$, to indicate that the battery pack 240 is in the zero-volt state.

The block 404 shows the waveforms for the control signals 322 and 342 when any undesirable condition (e.g., overcharge, over-voltage, over-current, over-temperature) occurs. In block 404, the control signal 322 is logically low to turn off the switches 204 and 206, and therefore the charging path 302 is disabled. In addition, the control signal 342 is a pulse signal having a period $T_2$ (e.g., two seconds) and a duty cycle $D_2$ (e.g., ½), such that the LED 312 generates a red flashing light having a frequency $1/T_2$ (e.g., 0.5 Hz) to indicate that an undesirable condition is occurring.

In addition, the block 406 shows the waveforms for the control signals 322 and 342 when the battery pack 240 is in the normal state. As shown in block 406, both of the control signals 322 and 342 are logically high, such that the charging path 302 is fully turned on and transfers the charging current $I_{chg}$ at the current level $I_1$ to charge the battery pack 240. At the same time, the LED 312 emits a constant red light to indicate that the battery pack 240 is in the normal state.

Furthermore, the block 408 shows the waveforms for the control signals 322 and 342 when the battery charging system 300 is in the idle state. As shown in block 408, both of the control signals 322 and 342 are logically low, such that the charging path 302 is disabled. At the same time, the LED 312 is disabled to indicate that the battery charging system 300 is in the idle state. If the battery pack 240 is fully charged, the battery charging system 300 can enter the idle state.

Figure 5:
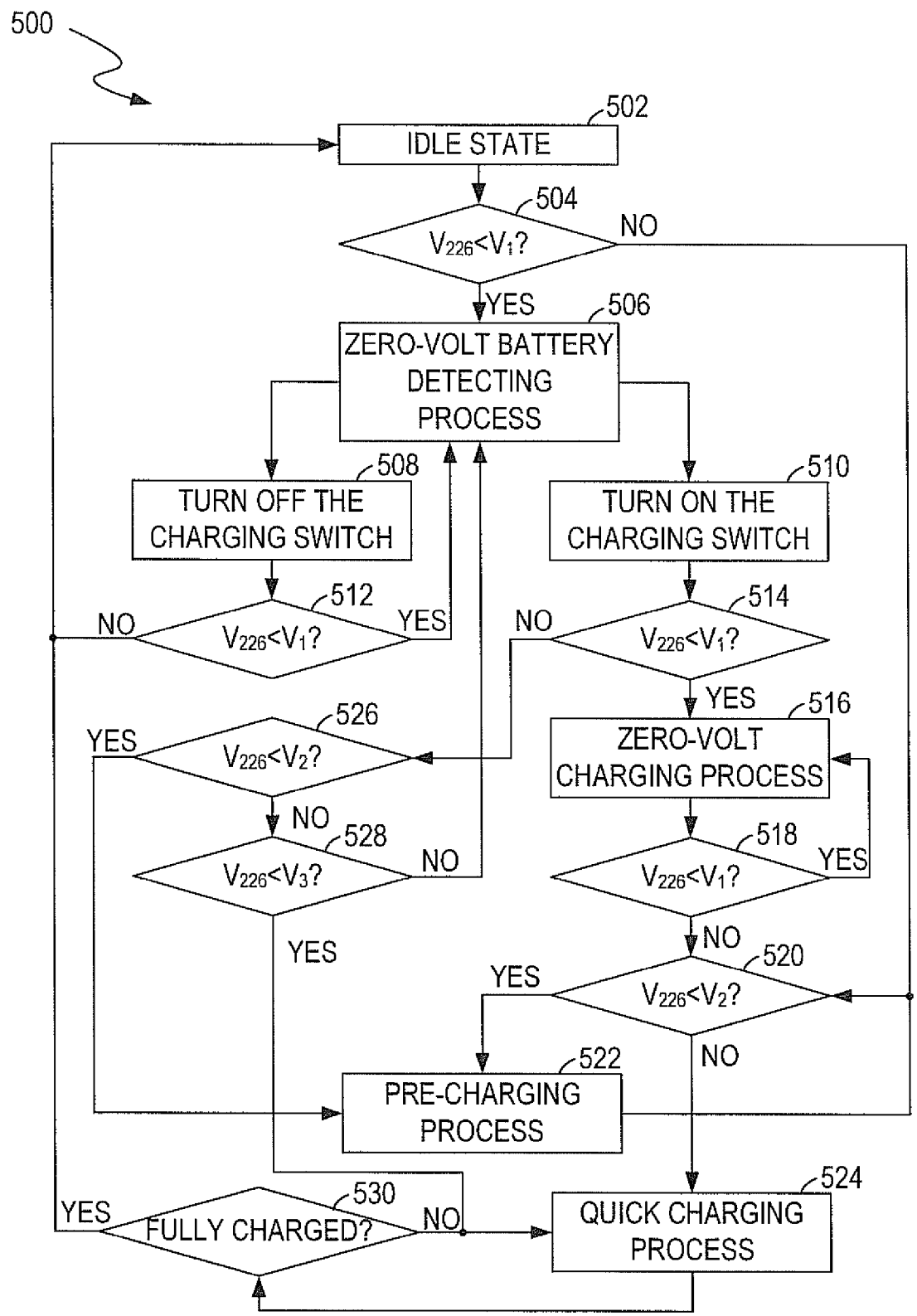
FIG. 5 illustrates a flowchart of examples of operations performed by a battery charging system, in accordance with one embodiment of the present invention.

FIG. 5 illustrates a flowchart 500 of examples of operations performed by a battery charging system, in accordance with one embodiment of the present invention. FIG. 5 is described in combination with FIG. 2A, FIG. 2B and FIG. 3.

In block 502, the battery charging system (e.g., 200, 200', 300) is in the idle state, in which the charging path (e.g., 202, 302) is disabled. The battery charging system 200 detects whether a fully charged battery pack 240 is coupled to the terminal 226. If the fully charged battery pack 240 is available, the battery charging system 200 is kept in the idle state. Otherwise, the flowchart 500 goes to block 504.

In block 504, the battery charging system 200 compares the voltage $V_{226}$ with the first predetermined threshold $V_1$. If the voltage $V_{226}$ is greater than the threshold $V_1$, which indicates that the battery pack 240 is in the normal state, the flowchart 500 goes to block 520 to start the normal charging process, e.g., including the pre-charging process and the quick-charging process. In the normal charging process, the charging path 202 is fully turned.

In block 520, the voltage $V_{226}$ is compared with the quick-charge threshold $V_2$. If the voltage $V_{226}$ is less than the threshold $V_2$, the flowchart 500 goes to block 522 to perform the pre-charging process. At the same time, the battery charging system 200 continues monitoring the voltage $V_{226}$. If the voltage $V_{226}$ reaches the threshold $V_2$, the flowchart 500 goes to block 524 to perform the quick-charging process. At the same time, as described in block 530, the battery charging system 200 detects whether the battery pack 240 is fully charged. When the battery pack 240 is fully charged, the flowchart 500 goes to block 502 to enter the idle state.

Returning to block 504, if the voltage $V_{226}$ is less than the threshold $V_1$, it indicates that the battery pack 240 is not available or that the battery pack 240 is available but in the zero-volt state. Thus, the flowchart 500 goes to block 506 to enter the zero-volt-state battery detecting process.

In block 506, the flowchart 500 alternately goes to block 508 and block 510. More specifically, in block 508, the charging switch 208 is turned off. In block 510, the charging switch 208 is turned on. When the charging switch 208 is alternately turned on and off, the monitoring terminal 226 can be alternately coupled to and decoupled from the power supply terminal 220.

In one embodiment, in block 506, the flowchart 500 first goes to block 510 to turn on the charging switch 208. In block 514, the voltage $V_{226}$ is compared with the threshold $V_1$. If the voltage $V_{226}$ is less than the threshold $V_1$, it indicates that the battery pack 240 is available and is in the zero-volt state. As such, the flowchart 500 goes to block 516 to perform the zero-volt-state charging process. In the zero-volt-state charging process, the enable signals 222 and 224 control the charging path 202 to have a relatively high resistance, so as to limit the charging current $I_{chg}$ to a relatively small current (e.g., $I_2$). As such, the zero-volt-state battery pack 240 is charged by the relatively small charging current $I_2$. At the same time, the battery charging system 200 determines whether the voltage $V_{226}$ reaches the threshold $V_1$, as described in block 518. When the voltage $V_{226}$ reaches the threshold $V_1$, the flowchart 500 goes to block 520.

Returning to block 514, if the voltage $V_{226}$ is greater than the threshold $V_1$, it can indicate that the battery pack 240 is not available, or it can also indicate that the battery pack 240 is available but in the normal state. This occurs because the battery pack 240 is charged by the charging current $I_{chg}$ when the charging switch 208 is turned on. The voltage $V_{226}$ may increase from a voltage that is less than $V_1$ to a voltage that is greater than $V_1$. The flowchart 500 goes to block 526 to compare the voltage $V_{226}$ with the threshold $V_2$. If the voltage $V_{226}$ is less than the threshold $V_2$, the flowchart 500 goes to block 522 to perform the pre-charging process. Otherwise, the flowchart 500 goes to block 528 to compare the voltage $V_{226}$ with the threshold $V_3$. If the voltage $V_{226}$ is less than the threshold $V_3$, the flowchart 500 goes to block 524 to perform the quick-charging process. If the voltage $V_{226}$ is equal to or greater than the threshold $V_3$, which indicates that the battery pack 240 is not available, the flowchart 500 goes to block 506. Then the flowchart 500 goes to block 508 to turn off the charging switch 208.

In block 512, the voltage $V_{226}$ is compared with the threshold $V_1$. In the example of flowchart 500, if the voltage $V_{226}$ is greater than the threshold $V_1$, the flowchart 500 goes back to block 502. In another embodiment, if the voltage $V_{226}$ is greater than the threshold $V_1$, the flowchart goes to block 520 to start the normal charging process. If the voltage $V_{226}$ is less than the threshold $V_1$, the flowchart 500 goes to block 506.

Figure 6:
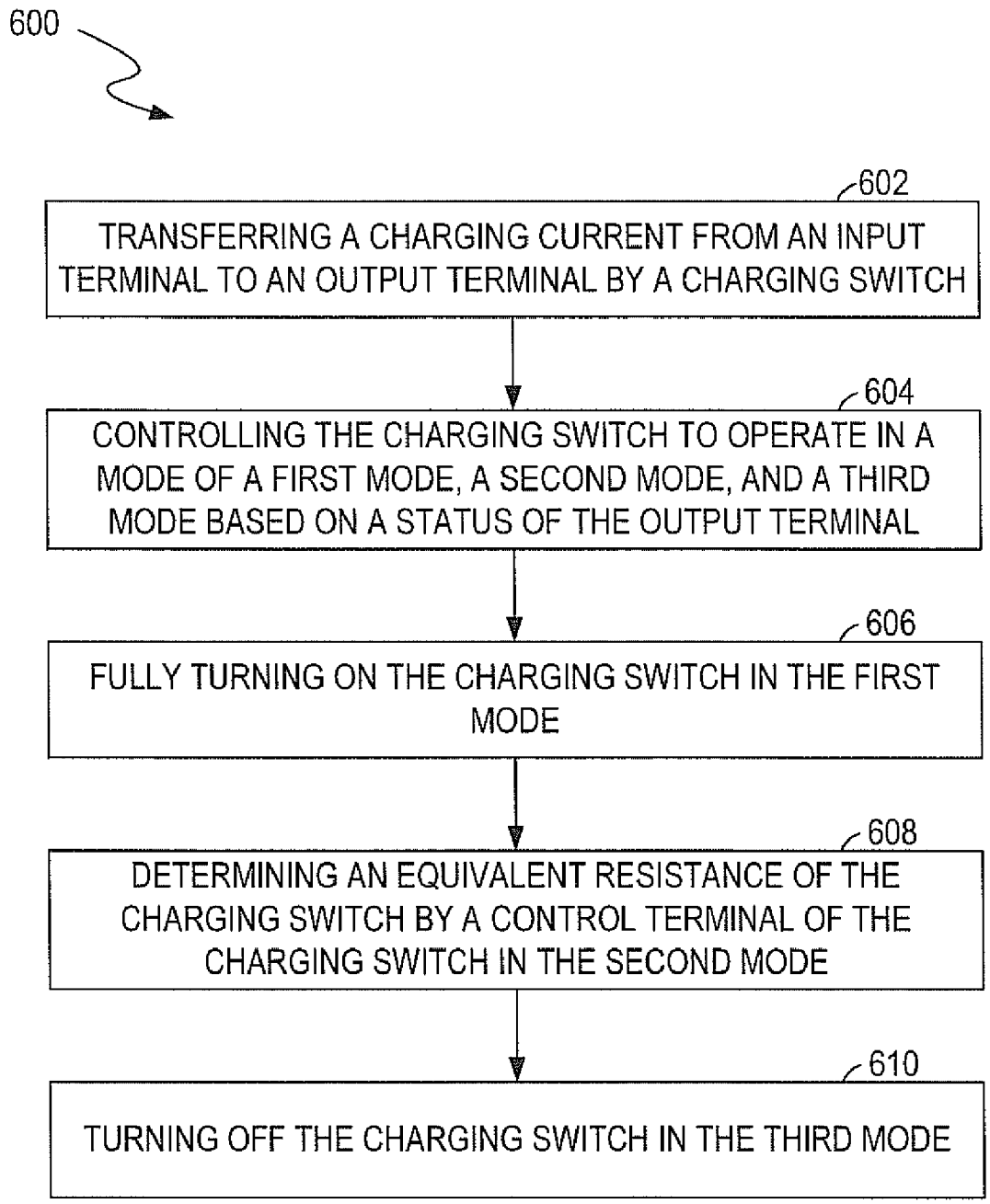
FIG. 6 illustrates a flowchart of examples of operations performed by a battery charging system, in accordance with one embodiment of the present invention.

FIG. 6 illustrates a flowchart 600 of examples of operations performed by a battery charging system (200, 200', 300), in accordance with one embodiment of the present invention. FIG. 6 is described in combination with FIG. 2A, FIG. 2B and FIG. 3.

In block 602, the charging switch 208 transfers the charging current $I_{chg}$ from the input terminal 220 to the output terminal 226.

In block 604, the enable signals 222 and 224 (or the control signals 322 and 342) control the charging switch 208 to operate in either a first, second or third mode, based on a status of the output terminal 226. For example, the enable signals 222 and 224 (or the control signals 322 and 342) are generated based on the first voltage $V_{226\_1}$ and the second voltage $V_{226\_2}$ of the output terminal 226.

In block 606, the enable signals 222 and 224 (or the control signals 322 and 342) fully turns on the charging switch 208 in the first mode.

In block 608, a control terminal of the charging switch 208, e.g., the gate terminal 208G of the charging switch 208, determines an equivalent resistance of the charging switch 208 in the second mode. For example, in the second mode, the charging switch 208 operates in the linear (ohmic) region and the equivalent resistance of the charging switch 208 is determined by the gate-source voltage $V_{gs}$ of the charging switch 208.

Furthermore, in block 610, the enable signals 222 and 224 (or the control signals 322 and 342) turns off the charging switch 208 in the third mode.

Figure 7:
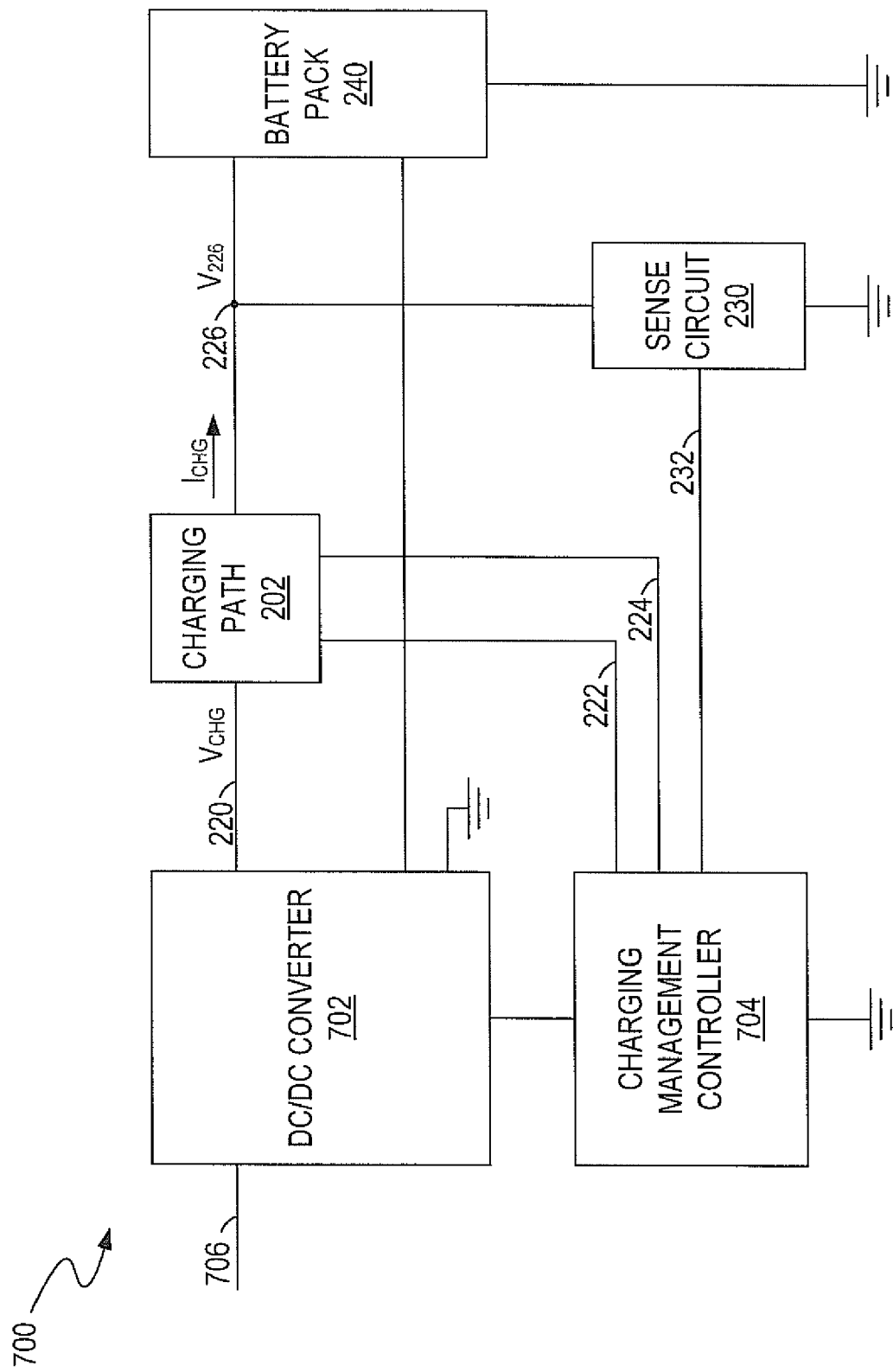
FIG. 7 illustrates a block diagram of an example of a battery charging system, in accordance with one embodiment of the present invention.

FIG. 7 illustrates a block diagram of an example of a battery charging system 700, in accordance with one embodiment of the present invention. Elements that are labeled the same as in FIG. 2A and FIG. 2B have similar functions. The battery charging system 700 includes a DC/DC converter 702 or a current/voltage regulator (not shown in FIG. 7) coupled between a power supply terminal 706 and the charging path 202. The DC/DC converter 702 provides the charging current $I_{chg}$ and/or the charging voltage $V_{chg}$. In addition, the battery charging system 700 includes a charging management controller 704 coupled between the charging path 202 and the sense circuit 230. The charging management controller 704 receives the feedback signal 232 and generates the enable signals 222 and 224 according to the feedback signal 232. The charging management controller 704 controls the charging path 202 to operate in either a normal current charging mode, a small current charging mode, or a disabled mode, based on a state of the battery pack 240. The controller 704 also controls the DC/DC converter 702 or the current/voltage regulator, thereby adjusting the charging current $I_{chg}$ according to the battery status (e.g., battery pack voltage, cell voltage, battery current, cell temperature, and cell capacity) of the battery pack 240.

In one embodiment, when the battery charging system 700 starts to operate, the controller 704 disables the charging path 202. If no battery voltage $V_{bat}$ is detected, the controller 704 alternately turns the charging path 202 on and off for the zero-volt-state battery detecting process. If a zero-volt-state battery pack 240 is detected, the controller 704 controls the charging path 202 to operate in the small current charging mode. In the small current charging mode, the equivalent resistance of the charging path 202 is determined by the gate terminal 208G of the charging switch 208 (in FIG. 2B). The controller 704 controls the charging path 202 to have a relatively high resistance, so as to limit the charging current $I_{chg}$ to a relatively small current (e.g., $I_2$). As such, the zero-volt-state battery pack 240 is charged by the relatively small charging current $I_2$. If a normal state battery pack 240 is detected, the controller 704 controls the charging path 202 to operate in the normal current charging mode. In the normal current charging mode, the controller 704 fully turns on the charging path 202. The controller 704 also controls the DC/DC converter 702 according to the status of the battery pack 240, so as to adjust the charging current $I_{chg}$ to a proper/desirable level, and/or to adjust the charging voltage $V_{chg}$ to a proper/desirable level. Furthermore, if a fully charged battery pack 240 is detected, the controller 704 controls the charging path 202 to operate in the disabled mode, so as to disable the charging path 202.

A power source (not shown in FIG. 7) can be coupled to the DC/DC converter 702 via the terminal 706. The power source can be, but is not limited to, an adapter or a universal serial bus device. The controller 704 can be implemented inside or outside the power source. Furthermore, the controller 704 can control the output (e.g., power output, voltage output, current output) of the power source according the status of the battery pack 240. In the example of FIG. 7, the charging current $I_{chg}$ is transferred by the charging path 202. However, in another embodiment, the charging current $I_{chg}$ is transferred by the charging path 302 (in FIG. 3), and the charging path 202 is omitted.

In summary, embodiments according to the present invention provide battery charging systems with controllable charging current by controlling a charging path under different conductance levels. The charging path includes a charging switch that is controlled to operate in different modes, e.g., have different conductance levels. The charging switch can be, but is not limited to, a MOSFET (e.g., a NMOSFET, a PMOSFET). The MOSFET can operate in the cut off region, or the linear (ohmic) region, or can be fully turned on according to one or more enable/control signals. When the battery pack is in the normal state, the charging path is fully turned on to transfer the normal charging current. When the battery pack is in the zero-volt state, the charging switch operates in the linear region, so as to limit the charging current to a relatively small current.

Embodiments according to the present invention also provide methods for charging the battery pack by the application of a battery charging system. The charging path is alternately enabled/disabled, such that the monitoring terminal is alternately coupled to and decoupled from the power supply terminal. The battery charging system detects the state of the battery pack based on the first voltage on the monitoring terminal when the charging path is enabled and based on a second voltage on the monitoring terminal when the charging path is disabled. The battery charging system further controls the conductance of the charging path according to the state of the battery pack. As a result, the battery pack can be charged by a proper current in different states.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A charging path comprising:
a charging switch for transferring a charging current from an input terminal to an output terminal; and
a first enable terminal coupled to said charging switch and for receiving a first enable signal to control said charging switch to operate in a mode of a plurality of modes comprising a first mode, a second mode, and a third mode, based on a status of said output terminal, wherein said status of said output terminal comprises a first voltage at said output terminal when said charging switch is turned on and a second voltage at said output terminal when said charging switch is turned off,
wherein said first enable terminal controls said charging switch to operate in said first mode when said second voltage is greater than a first predetermined threshold and less than a second predetermined threshold, wherein said charging switch is fully turned on in said first mode,
wherein said first enable terminal controls said charging switch to operate in said second mode when said first and second voltages are less than said first predetermined threshold, wherein an equivalent resistance of said charging switch is determined by a control terminal of said charging switch in said second mode, and
wherein said first enable terminal controls said charging switch to operate in said third mode when said second voltage is equal to or greater than said second predetermined threshold, wherein said charging switch is turned off in said third mode.

2. The charging path as claimed in claim 1, wherein said charging switch comprises a metal-oxide-semiconductor field-effect transistor (MOSFET), and wherein said control terminal is a gate terminal of said MOSFET.

3. The charging path as claimed in claim 1, wherein said first enable terminal is coupled to a controller that provides said first enable signal.

4. The charging path as claimed in claim 1, further comprising a resistor divider network comprising:
a first resistor coupled between said input terminal and said control terminal;
a second resistor coupled between said control terminal and ground via a first switch; and
a third resistor coupled between said control terminal and ground via a second switch.

5. The charging path as claimed in claim 4, further comprising a second enable terminal for receiving a second enable signal, wherein said first and second enable signals control said charging switch to operate in said mode of said first, second and third modes by respectively controlling said first and second switches.

6. The charging path as claimed in claim 1, wherein said status of said output terminal is detected by alternately turning on and off said charging switch.

7. The charging path as claimed in claim 1, wherein said charging switch operates in said second mode when said status of said output terminal is being detected.

8. A method for transferring a charging current, comprising:
transferring said charging current from an input terminal to an output terminal by a charging switch;
controlling said charging switch to operate in a mode of a plurality of modes comprising a first mode, a second mode, and a third mode, based on a first voltage at said output terminal when said charging switch is turned on and based on a second voltage at said output terminal when said charging switch is turned off;
controlling said charging switch to operate in said first mode when said second voltage is greater than a first predetermined threshold and less than a second predetermined threshold;
fully turning on said charging switch in said first mode;
controlling said charging switch to operate in said second mode when said first and second voltages are less than said first predetermined threshold;
determining an equivalent resistance of said charging switch by a control terminal of said charging switch in said second mode;
controlling said charging switch to operate in said third mode when said second voltage is equal to or greater than said second predetermined threshold; and
turning off said charging switch in said third mode.

9. The method as claimed in claim 8, wherein said charging switch comprises a metal-oxide-semiconductor field-effect transistor (MOSFET), and wherein said control terminal is a gate terminal of said MOSFET.

10. The method as claimed in claim 8, further comprising:
controlling said charging switch by using a resistor divider network that has a first resistor coupled between said input terminal and said control terminal, a second resistor coupled between said control terminal and ground via a first switch, and a third resistor coupled between said control terminal and ground via a second switch.

11. The method as claimed in claim 10, further comprising:
controlling said charging switch to operate in said mode of said first, second and third modes by controlling said first and second switches.

12. The method as claimed in claim 8, further comprising:
detecting a status of said output terminal by alternately turning on and off said charging switch, wherein said status comprises said first voltage and said second voltage.

13. A battery charging system comprising:
a charging path for transferring a charging current from an input terminal to a battery pack; and
a controller coupled to said charging path and for controlling said charging path to operate in a mode of a plurality of modes comprising a normal current charging mode, a small current charging mode, and a disabled mode, based on a state of said battery pack, wherein said controller detects said state of said battery pack based on a first voltage at an output terminal of said charging path when said charging path is enabled and based on a second voltage at said output terminal when said charging path is disabled,
wherein said controller controls said charging path to operate in said normal current charging mode when said second voltage is greater than a first predetermined threshold and less than a second predetermined threshold, wherein said charging path is fully turned on in said normal current charging mode,
wherein said controller controls said charging path to operate in said small current charging mode when said first and second voltages are less than said first predetermined threshold, wherein an equivalent resistance of said charging path is determined by a control terminal of said charging path in said small current charging mode, and
wherein said controller controls said charging path to operate in said disabled mode when said second voltage is equal to or greater than said second predetermined threshold, wherein charging path is disabled in said disabled mode.

14. The battery charging system as claimed in claim 13, wherein said charging path comprises a metal-oxide-semiconductor field-effect transistor (MOSFET), and wherein said control terminal is a gate terminal of said MOSFET.

15. The battery charging system as claimed in claim 13, further comprising a resistor divider network having a first resistor coupled between said input terminal and said control terminal, a second resistor coupled between said control terminal and ground via a first switch, and a third resistor coupled between said control terminal and ground via a second switch and a third switch.

16. The battery charging system as claimed in claim 15, further comprising a light emitting diode (LED) coupled between a power source and ground via a fourth switch and configured to indicate said state of said battery pack, wherein said controller controls said first and second switches using a same first control signal, and wherein said controller controls said third and fourth switches using a same second control signal.

17. The battery charging system as claimed in claim 13, wherein said state of said battery pack is detected by alternately enable and disable said charging path.

18. The battery charging system as claimed in claim 13, wherein said charging path operates in said small current charging mode when said state of said battery pack is being detected.

* * * * *